United States Patent
Niwa et al.

(10) Patent No.: US 9,337,477 B2
(45) Date of Patent: May 10, 2016

(54) LITHIUM SECONDARY BATTERY ELECTRODE INCLUDING COATED LAYER HAVING ACRYLIC COPOLYMER CHEMICALLY BONDED TO BINDER OF ACTIVE MATERIAL LAYER AND MANUFACTURING PROCESS FOR THE SAME

(75) Inventors: Junichi Niwa, Kariya (JP); Yuichi Hirakawa, Kariya (JP); Manabu Miyoshi, Kariya (JP); Keiichi Hayashi, Kariya (JP); Hitotoshi Murase, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 202 days.

(21) Appl. No.: 14/119,239
(22) PCT Filed: May 2, 2012
(86) PCT No.: PCT/JP2012/002977
§ 371 (c)(1),
(2), (4) Date: Nov. 21, 2013
(87) PCT Pub. No.: WO2012/160763
PCT Pub. Date: Nov. 29, 2012

(65) Prior Publication Data
US 2014/0186704 A1 Jul. 3, 2014

(30) Foreign Application Priority Data

May 23, 2011 (JP) .................................. 2011-114699
Dec. 5, 2011 (JP) .................................. 2011-266028

(51) Int. Cl.
*H01M 4/04* (2006.01)
*H01M 4/62* (2006.01)
(Continued)

(52) U.S. Cl.
CPC ............ *H01M 4/139* (2013.01); *H01M 4/0404* (2013.01); *H01M 4/0471* (2013.01);
(Continued)

(58) Field of Classification Search
CPC ......... H01M 4/13; H01M 4/139; H01M 4/62; H01M 4/622; H01M 4/0471; H01M 4/1391; H01M 4/505; H01M 4/0404; H01M 4/131
USPC ...................................... 429/217, 212; 427/58
See application file for complete search history.

(56) References Cited

U.S. PATENT DOCUMENTS

2011/0151325 A1* 6/2011 Kim et al. ...................... 429/212
2011/0244326 A1* 10/2011 Murase et al. ................. 429/217

FOREIGN PATENT DOCUMENTS

JP 09050802 A * 2/1997
JP 10-312803 A 11/1998
(Continued)

OTHER PUBLICATIONS

Sakamoto, M., Machine translation of JP 09-050802 A, Feb. 1997.*
(Continued)

Primary Examiner — Sean P Cullen
(74) Attorney, Agent, or Firm — Sughrue Mion, PLLC

(57) ABSTRACT

To provide a lithium ion secondary battery electrode in which a coated layer is held on a surface of an active material layer over a long period of time to suppress decomposition of the electrolysis solution and to enhance the cyclability, a manufacturing process for the same, and a lithium ion secondary battery using the electrode. A lithium ion secondary battery electrode includes a current collector, an active material layer containing a binder formed on a surface of the current collector, and a coated layer formed on the surface of at least a part of the active material layer, wherein the coated layer is an acrylic type copolymer cured substance including an acrylic type main chain and a side chain having polyester or polyether graft-polymerized to the acrylic type main chain and the coated layer is chemically bonded with the binder.

8 Claims, 3 Drawing Sheets

(51) Int. Cl.
*H01M 4/139* (2010.01)
*H01M 4/13* (2010.01)
*H01M 4/131* (2010.01)
*H01M 4/1391* (2010.01)
*H01M 4/505* (2010.01)
*H01M 4/136* (2010.01)
*H01M 4/36* (2006.01)
*H01M 4/1397* (2010.01)
*H01M 4/38* (2006.01)
*H01M 4/485* (2010.01)
*H01M 10/0525* (2010.01)

(52) U.S. Cl.
CPC ............... *H01M 4/13* (2013.01); *H01M 4/131* (2013.01); *H01M 4/1391* (2013.01); *H01M 4/505* (2013.01); *H01M 4/62* (2013.01); *H01M 4/622* (2013.01); *H01M 4/136* (2013.01); *H01M 4/1397* (2013.01); *H01M 4/366* (2013.01); *H01M 4/38* (2013.01); *H01M 4/485* (2013.01); *H01M 10/0525* (2013.01); *Y02E 60/122* (2013.01); *Y02P 70/54* (2015.11)

(56) References Cited

FOREIGN PATENT DOCUMENTS

| | | |
|---|---|---|
| JP | 11-354104 A | 12/1999 |
| JP | 2000-173343 A | 6/2000 |
| JP | 2000-294230 A | 10/2000 |
| JP | 2004-265609 A | 9/2004 |
| JP | 2004-356044 A | 12/2004 |
| JP | 2008-186731 A | 8/2008 |
| JP | 2008-537293 A | 9/2008 |
| JP | 2009-43678 A | 2/2009 |
| JP | 2010097832 A * | 4/2010 |
| JP | 2011-14387 A | 1/2011 |
| JP | 2011-166044 A | 8/2011 |
| WO | WO 2009022513 A1 * | 2/2009 |

OTHER PUBLICATIONS

Sakaguchi et al., Machine translation of JP 2010-097832 A, Apr. 2010.*

Lutz, Jean-Francois, Polymerization of Oligo(Ethylene Glycol) (Meth)Acrylates: Toward New Generations of Smart Biocompatible Materials, Journal of Polymer Science: Part A: Polymer Chemistry, 45, 3459-3470.*

* cited by examiner

LITHIUM SECONDARY BATTERY ELECTRODE INCLUDING COATED LAYER HAVING ACRYLIC COPOLYMER CHEMICALLY BONDED TO BINDER OF ACTIVE MATERIAL LAYER AND MANUFACTURING PROCESS FOR THE SAME

CROSS REFERENCE TO RELATED APPLICATIONS

This application is a National Stage of International Application No. PCT/JP2012/002977 filed May 2, 2012, claiming priority based on Japanese Patent Application Nos. 2011-114699 filed May 23, 2011 and 2011-266028 filed Dec. 5, 2011, the contents of all of which are incorporated herein by reference in their entirety.

TECHNICAL FIELD

The present invention relates to a lithium ion secondary battery electrode, a manufacturing process for the same and lithium ion secondary battery using the electrode.

BACKGROUND ART

A lithium ion secondary battery is a secondary battery that has high charging/discharging capacity and that can carry out high output. The lithium ion secondary battery is currently used mainly as a power source for a portable electronic device, and is further expected to be used as a power source for an electric automobile, which is assumed to prevail in the future. The lithium ion secondary battery has, at a positive electrode and a negative electrode, an active material that can insert and desorb lithium (Li). The lithium ion secondary battery operates when the lithium ions move in an electrolysis solution provided between the electrodes.

The lithium ion secondary battery is desired to maintain the discharging capacity even after repeating charging and discharging. However, the charging/discharging cycle lifespan of the lithium ion secondary battery becomes short as the electrode active material and the electrolysis solution gradually react thus decomposing the electrolysis solution.

Various considerations have been made to suppress such decomposition of the electrolysis solution. For example, Patent Literature 1 discloses mixing a chemical compound, which contains polysiloxane, perfluoropolyether, perfluoroalkane, and derivatives thereof, in the electrolysis solution, and forming a coated layer of the chemical compound on the positive electrode or the negative electrode. Such chemical compounds are chemical compounds that have smaller surface tension than the electrolysis solution and that are insoluble in the electrolysis solution, and thus the coated layer is formed on the electrode in the battery when the battery is assembled. Patent literature 2 discloses covering a lithium ion conductive polymer compound including a polyethylene glycol unit on the active material consisting tin oxide or composite tin oxide.

However, the coated layer may detach from the electrode as the number of cycles becomes greater in a battery in which the coated layer is attached to the electrode as described in Patent Literature 1, and it is troublesome to cover the polymer compound on the active material itself as described in Patent Literature 2.

Patent Literature No. 1: Japanese Unexamined Patent Publication (KOKAI) Gazette No. 2004-265609

Patent Literature No. 2: Japanese Unexamined Patent Publication (KOKAI) Gazette No. 10-312803

DISCLOSURE OF THE INVENTION

Assignment to be Solved by the Invention

In view of the current situation of the conventional art, it is a main object of the present invention to form a coated layer that can be held over a long period of time on a surface of an active material layer, and to provide a lithium ion secondary battery electrode that can suppress the decomposition of the electrolysis solution using the coated layer and enhance the cyclability of the battery, a manufacturing process for the same, and a lithium ion secondary battery using the electrode.

Means for Solving the Assignment

The present inventors have conducted thorough researches to achieve the object described above. The inventors found as a result that the cyclability of the lithium ion secondary battery can be enhanced by forming the coated layer consisting of acrylic type copolymer cured substance on at least a part of a surface of the active material layer.

In other words, a lithium ion secondary battery electrode according to the present invention includes a current collector, an active material layer containing a binder formed on a surface of the current collector, and a coated layer formed on a surface of at least a part of the active material layer; wherein the coated layer consists of an acrylic type copolymer cured substance including an acrylic type main chain and a side chain having polyester or polyether graft-polymerized to the acrylic type main chain and the coated layer is chemically bonded with the binder.

The coated layer is preferably formed on the surface of the active material layer by thermally decomposing at least a part of the polyester or the polyether to be chemically bonded with the binder.

According to a lithium ion secondary battery of the present invention, at least one of a positive electrode and a negative electrode is aforementioned lithium ion secondary battery electrode. The positive electrode preferably includes a positive electrode active material that does not contain Li. The positive electrode active material preferably includes at least one selected from elemental sulfur, sulfur-carbon composite, manganese dioxide, and vanadium oxide.

The lithium ion secondary battery can be mounted on a vehicle.

A manufacturing process for a lithium ion secondary battery electrode according to the present invention includes a slurry making step of mixing an active material, a binder resin, and an acrylic type copolymer to make slurry; a slurry applying step of applying the slurry on a surface of a current collector; and a heat treatment step of heating the slurry applied onto the surface of the current collector to cure the binder resin and the acrylic type copolymer and to chemically bond the acrylic type copolymer and the binder resin; wherein the acrylic type copolymer includes an acrylic type main chain and a side chain having polyester or polyether graft-polymerized to the acrylic type main chain and in the slurry making step, the acrylic type copolymer and the binder resin are incompatible with each other.

Effects of the Invention

The lithium ion secondary battery electrode according to the present invention has a coated layer consisting of acrylic type copolymer cured substance chemically bonded with the binder formed on a surface of at least a part of the active material layer. By the coated layer formed on the surface of the active material layer, the active material, and the like, which are assumed to decompose the electrolysis solution, can be prevented from directly making contact with the electrolysis solution. The electrolysis solution can be prevented from decomposing due to the active material. Furthermore, the coated layer is less likely to fall off from the active material layer because the coated layer is chemically bonded with the binder.

The lithium ion secondary battery including the lithium ion secondary battery electrode described above thus has an excellent cyclability.

According to the manufacturing process for the lithium ion secondary battery electrode of the present invention, an electrode that enables the lithium ion secondary battery to have excellent cyclability can be manufactured.

Because the lithium ion secondary battery has excellent cyclability, the vehicle becomes a high performance vehicle by mounting aforementioned lithium ion secondary battery on the vehicle.

EXPLANATION ON REFERENCE NUMERALS

1: current collector,
2: active material,
3: binder,
4: conductive additive,
5: active material layer,
6: coated layer

MODES FOR CARRYING OUT THE INVENTION (Lithium Ion Secondary Battery Electrode)

Figure 1:
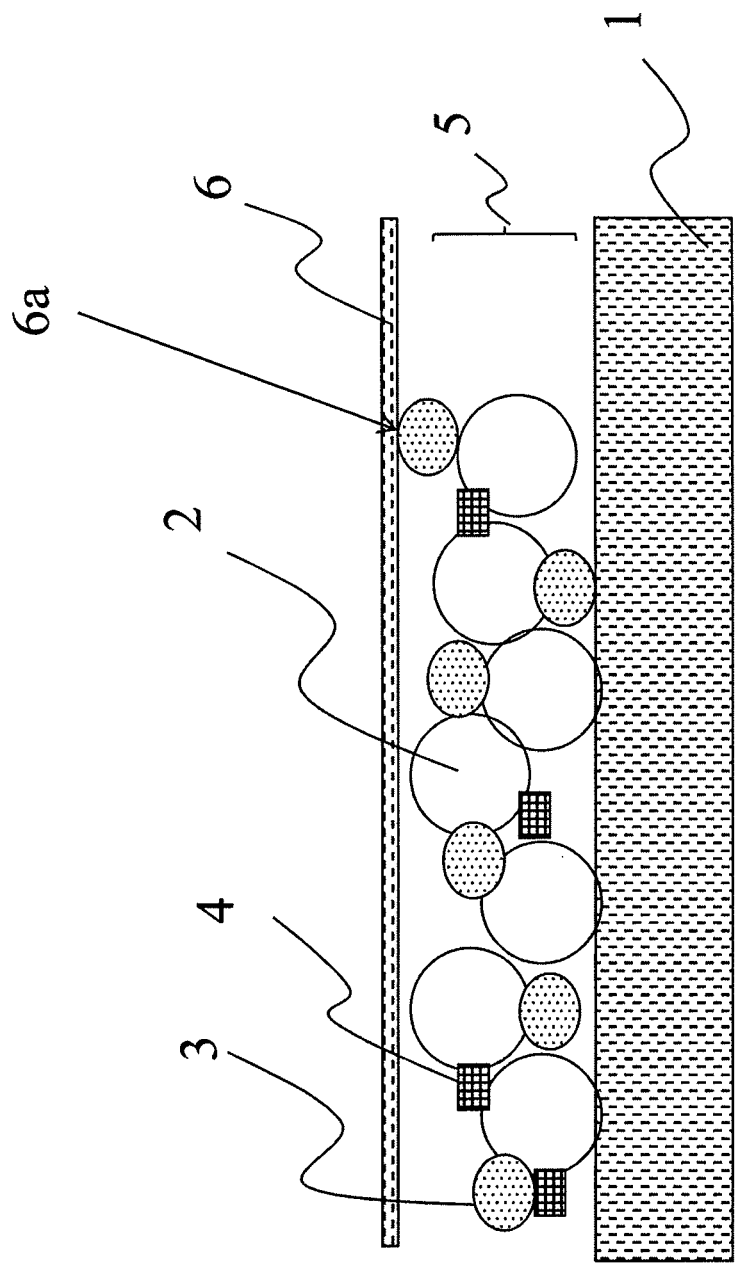
FIG. 1 is a schematic diagram that explains a lithium ion secondary battery electrode of the present embodiment.

A lithium ion secondary battery electrode according to the present invention is explained using FIG. 1. FIG. 1 is a schematic diagram that explains a lithium ion secondary battery electrode of the present embodiment.

FIG. 1 shows a current collector 1, and an active material layer 5 formed on the current collector 1. In the active material layer 5, the active material 2 and the conductive additive 4 are held on the current collector 1 by way of the binder 3. A coated layer 6, which is chemically bonded with the binder 3 at an area 6a, is formed on a surface of at least one part of the active material layer 5. FIG. 1 is a schematic diagram, and the size and shape are not accurately illustrated. For example, the coated layer 6 is illustrated in a plate shape in FIG. 1, but the actual coated layer 6 is an indeterminate form and is formed to be a thin film form along the surface of the active material layer 5.

The coated layer 6 covers at least a part of the surface of the active material layer 5. The coated layer 6 thus also covers the active material 2 at the surface of the active material layer 5. The surface of the active material layer 5 may include a portion that is not partially covered by the coated layer 6. The entire surface of the active material layer 5 is desirably covered by the coated layer 6.

As shown in FIG. 1, the coated layer 6 is formed on the surface of at least a part of the active material layer 5, and the coated layer 6 is bonded with the binder 3. Thus, the electrolysis solution can be prevented over a long period of time by the coated layer 6 from decomposing due to the active material 2, and the like contained in the active material layer 5.

The lithium ion secondary battery electrode according to the present invention includes the current collector, the active material layer, and the coated layer formed on the surface of at least apart of the active material layer, wherein the coated layer consists of an acrylic type copolymer cured substance including an acrylic type main chain and a side chain having polyester or polyether graft-polymerized to the acrylic type main chain and the coated layer is chemically bonded with the binder.

The current collector refers to a chemically inactive highly-electron-conductive body for keeping electric current flowing to electrodes during discharging or charging. The current collector may adopt shapes like foil, plate, and the like. The configuration is not limited to above especially as far as it takes the shape corresponding to the purpose. For example, a metal foil such as copper foil, nickel foil, aluminum foil, stainless foil, and the like can be suitably used as the current collector.

The active material layer includes an active material and a binder. The active material layer may include a conductive additive, as needed.

The active material refers to a substance that directly contributes to electrode reactions such as charging reactions and discharging reactions. An appropriate positive electrode active material is lithium containing compound. For example, lithium containing metal composite oxide such as lithium-cobalt composite oxide, lithium-nickel composite oxide, lithium-manganese composite oxide, and the like can be used as the positive electrode active material.

The positive electrode active material that does not contain Li, for example, other metal compounds or polymer materials may also be used for the positive electrode active material. As other metal compounds, for example, oxides such as titanium oxide, vanadium oxide, manganese dioxide, or the like, disulfides such as titanium sulfide, molybdenum sulfide, or the like, elemental sulfur, and sulfur-carbon composite are given. The sulfur-carbon composite refers to that in which the sulfur is arranged in pores of the carbon so that the sulfur and the carbon make a composite. Acetylene black or mesoporous carbon can be used for the carbon in the sulfur-carbon composite. As the polymer material, for example, conductive polymer such as polyaniline, polythiophene, and the like, are given. The positive electrode active material that does not contain Li is not particularly limited. The positive electrode active material that does not contain Li preferably includes at least one selected from the elemental sulfur, the sulfur-carbon composite, manganese dioxide, and vanadium oxide.

Carbon based materials that can occlude and release lithium, metals that can be alloyed with lithium, alloy of such metals or compound of such metals, polymer material, and the like can be used for the negative electrode active material.

As the carbon based material, non-graphitizable carbon, artificial graphite, cokes, graphites, glassy carbons, organic polymer compound burnt body, carbon fiber, activated carbon, and carbon black are given. The organic polymer compound burnt body refers to a body in which the polymer material such as phenols and furans are burnt at an appropriate temperature and carbonized.

As the element that can be alloyed with lithium, Na, K, Rb, Cs, Fr, Be, Mg, Ca, Sr, Ba, Ra, Ti, Ag, Zn, Cd, Al, Ga, In, Si, Ge, Sn, Pb, Sb, and Bi are given. Among them, the element that can be alloyed with lithium is preferably silicon (Si) or tin (Sn). As the element compound including the element that can be alloyed with lithium, ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), $SnO_w$ (0<w≤2), $SnSiO_3$, LiSiO, LiSnO or the like are given. The element compound including the element that can be alloyed with lithium is preferably silicon compound or tin compound. The silicon compound is preferably $SiO_x$ (0.5≤x≤1.5). As the tin compound, for example, tin alloy (Cu—Sn alloy, Co—Sn alloy, etc.) is given.

Among them, it is preferable that the negative electrode active material includes silicon (Si), and furthermore, it is more preferable that the negative electrode active material includes $SiO_x$ (0.5≤x≤1.5). The silicon has large theoretical capacity. On the other hand, the volume change of silicon at the time of charging/discharging is large. By using $SiO_x$, the volume change of silicon at the time of charging/discharging can be reduced.

As the polymer material, polyacetylene, polypyrrole, and the like are given.

The binder is used as a binding agent for fixing the active material and the conductive additive to the current collector. The binder is desired to bind the active material, and the like with as small amount as possible, and the amount of the binder is desirably 0.5% by mass to 50% by mass assuming the total amount of the active material, the conductive additive, and the binder is 100% by mass.

The binder that is incompatible with the acrylic type copolymer can be used as the binder of the present invention. As the binder, for example, cured substance of polyvinylidene fluoride (PVDF), cured substance of fluorine polymer such as polytetrafluoroethylene (PTFE), and the like, cured substance of rubber such as stylene butadiene rubber (SBR), and the like, cured substance of imide based polymer such as polyimide, polyamideimide, and the like, and cured substance of alkoxysilyl group containing resin can be used.

The conductive additive is added to enhance the conductivity of the electrode layer. As the conductive additive, carbon black, graphite, acetylene black (AB), Ketjen black (KB), Vapor Grown Carbon Fiber (VGCF), and the like, which are carbonaceous particulates, can be added alone or in a combination of two or more types. The usage amount of the conductive additive is not particularly limited, and for example, about 20 to 100 parts by mass can be used with respect to 100 parts by mass of active material.

The coated layer is formed on the surface of at least a part of the active material layer. The active material layer contains substances that may possibly decompose the electrolysis solution, for example, the active material and the conductive additive. It is said that the electrolysis solution is decomposed by an active group such as the OH group, and the like at the surface of the active material, for example, under low voltage and reducing atmosphere. Because of covering the surface of the active material layer by the coated layer, the active material or the conductive additive and the electrolysis solution can be prevented from directly making contact with each other. The decomposition of the electrolysis solution can be suppressed as long as the electrolysis solution is not directly brought into contact with the active group at the surface of the active material or the conductive additive that decomposes the electrolysis solution.

The main skeleton of the coated layer is acryl. The surface tension of the slurry can be lowered by adding the acrylic type copolymer, in which the main skeleton is acryl, to the slurry obtained by mixing the active material and the binder resin. Because the coated layer is formed on the surface of the slurry, the coated layer formed on the surface of the slurry can be formed as an even coated layer without extreme unevenness in film thickness as the surface tension of the slurry lowers. When the coated layer has extreme film thickness unevenness, the coated layer may have locally high resistance at areas of thick film thickness when the battery is produced, and the lithium may precipitate at the high resistance portion of the coated layer thus causing internal short circuit. As the coated layer can be formed as an even coated layer without extreme unevenness in film thickness, internal short circuit can be prevented.

The coated layer needs to be formed on the surface of at least a part of the active material layer. It is desirable that the coated layer covers the entire surface of the active material layer. When the coated layer covers the entire surface of the active material layer, the entire active group such as the active material and the like, which is assumed to decompose the electrolysis solution, can be prevented from making contact with the electrolysis solution, and the decomposition of the electrolysis solution can be reliably suppressed.

The coated layer in the present invention consists of acrylic type copolymer cured substance including the acrylic type main chain and the side chain having polyester or polyether graft-polymerized to the acrylic type main chain. Polyacrylate, polymethacrylate, and the like can be used as the acrylic type. In other words, the polyester-acrylate copolymer cured substance, polyether-acrylate copolymer cured substance, polyester-methacrylate copolymer cured substance, polyether-methacrylate copolymer cured substance, and the like can be used as the acrylic type copolymer cured substance.

The acrylic type copolymer is incompatible with the binder resin and the organic solvent. Because the surface activity of acryl is high, the acrylic type copolymer tends to be easily oriented at the air-liquid interface in the slurry. Thus, the acrylic type copolymer is oriented on the surface of the applied slurry and spread to a film form.

The coated layer is chemically bonded with the binder. The chemical bond refers to a chemically bonded state and the chemical bond generally includes types such as ion bond, covalent bond, metal bond, hydrogen bond, and the like. The chemical bond of the coated layer and the binder is a chemical bond of acrylic type copolymer (organic substance) and the binder (organic substance) and thus such chemical bond is mainly covalent bond. The thermally decomposed material of polyester or polyether and the binder are preferably reacted and chemically bonded. Because the coated layer and the binder are chemically bonded, the coated layer is less likely to be stripped off from the active material layer even if the active material is expanded or contracted due to charging/discharging of the electrode. The effect of suppressing decomposition of the electrolysis solution thus lasts for a long time.

(Manufacturing Process for Lithium Ion Secondary Battery Electrode)

The manufacturing process for the lithium ion secondary battery electrode according to the present invention includes a slurry making step, a slurry applying step, and a heat treatment step. In the slurry making step, the active material, the binder resin, and the acrylic type copolymer are mixed to make the slurry. The solvent and the conductive additive may be added to the slurry as necessary. In the slurry applying step, the slurry is applied onto the surface of the current collector. In the heat treatment step, the slurry applied onto the surface of the current collector is heated to cure the binder resin and the acrylic type copolymer and to chemically bond the acrylic type copolymer and the binder resin.

The active material, the binder resin, the acrylic type copolymer and the conductive additive are similar to those described above. A general solvent used in the lithium ion secondary battery can be used as the solvent. For example, N-methylpyrrolidone (NMP), methanol, methylisobutylketone (MIBK), and the like can be used as the solvent.

When mixing the above materials to make the slurry, a general mixing device such as a planetary mixer, defoaming kneader, ball mill, paint shaker, vibration mill, Raikai mixer, agitator mill, and the like can be used.

The mixing proportion of the acrylic type copolymer with respect to the slurry is preferably such that the acrylic type copolymer is 0.1% by mass to 2% by mass assuming the entire slurry is 100% by mass. With such mixing proportion, a very thin coated layer made of acrylic type copolymer cured substance can be covered on substantially the entire active material layer.

As the method for applying the slurry, the applying method generally used when producing the secondary battery electrode such as a roll coat method, dip coat method, doctor blade method, spray coat method, curtain coat method, and the like can be used. The applied thickness of the slurry applied onto the surface of the current collector is preferably 10 µm to 20 µm.

In the heat treatment step, the heating is carried out at a temperature at which the acrylic type copolymer and the binder resin can be chemically bonded in accordance with the curing temperature of the binder resin to be used and the acrylic type copolymer to be used. In the heat treatment step, the polyester or the polyether, which is the side chain of the acrylic type copolymer, is preferably heated and decomposed, and the acrylic type copolymer and the binder resin are preferably chemically bonded through the heated and decomposed functional group.

According to the heat treatment step, the active material layer is formed on the current collector, and the coated layer consisting of acrylic type copolymer cured substance is formed on the surface of the active material layer. Furthermore, the coated layer is chemically bonded with the binder.

(Lithium Ion Secondary Battery)

In the lithium ion secondary battery according to the present invention, at least one of the positive electrode and the negative electrode is aforementioned lithium ion secondary battery electrode. As long as at least one of the positive electrode and the negative electrode is aforementioned lithium ion secondary battery electrode, the decomposition of the electrolysis solution by the positive electrode active material, the negative electrode active material, and the like can be suppressed, and the lithium ion secondary battery can have excellent cyclability.

The lithium ion secondary battery that uses the lithium ion secondary battery electrode described above can use a known battery component other than using the lithium ion secondary battery electrode described above, and can also be manufactured through a known method.

In other words, the lithium ion secondary battery according to the present invention includes the positive electrode, the negative electrode, the separator, and the electrolysis solution for the battery components. In the lithium ion secondary battery according to the present invention, at least one of the positive electrode and the negative electrode is aforementioned lithium ion secondary battery electrode.

In the lithium ion secondary battery according to the present invention, the positive electrode active material and the negative electrode active material are preferably used in a combination in which the material that can react with lithium (Li) and that has high potential at the time of reaction is the positive electrode active material and the material that has low potential at the time of reaction is the negative electrode active material. The positive electrode active material may contain or may not contain Li used at the time of reaction. When the positive electrode active material does not contain Li used at the time of reaction, Li may be externally supplied to the negative electrode active material.

The positive electrode active material that does not contain Li is not particularly limited. The positive electrode active material that does not contain Li preferably includes at least one selected from the elemental sulfur, the sulfur-carbon composite, manganese dioxide, and vanadium oxide. By using the positive electrode including such positive electrode active materials, the lithium ion secondary battery having high battery capacity can be obtained.

When the positive electrode includes the positive electrode active material that does not contain Li, the negative electrode active material needs to contain Li. Thus, when the negative electrode active material that does not contain Li, for example, a carbon based material, an element that can be alloyed with lithium or/and an element compound including element that can be alloyed with lithium, or a polymer material is used as the negative electrode active material, Li needs to be doped (inserted) to the negative electrode active material.

As a method for doping Li to the negative electrode active material, a method for inserting (pre-doping) Li to the negative electrode active material in advance may be used, or a method for inserting Li to the negative electrode active material when using as a battery may be used.

For example, as a method for pre-doping Li to the negative electrode active material, a method for inserting Li by an electrolytic doping method in which a half-cell using a metal lithium as the counter electrode is assembled and Li is doped electrochemically, a method for inserting Li by an attachment pre-doping method in which a metal lithium foil is attached to the electrode and then the electrode is left in the electrolysis solution as a result Li is doped using the diffusion of lithium to the electrode, and the like are given. After inserting Li in advance through such methods, the battery may be configured in combination with the counter electrode.

As a method for inserting Li to the negative electrode active material when using as a battery, a method for integrating an Li source (e.g., metal Li, etc.) at the surface and/or interior of the negative electrode in advance and forming the negative electrode can be used.

The amount of Li to pre-dope into the negative electrode active material or the amount of Li to integrate with the negative electrode variously differs depending on the type and combination of positive electrode active material, negative electrode active material, electrolysis solution, and the like, and usage conditions of the battery such as voltage. The amount of Li is thus obtained by appropriately performing actual measurement or calculation according to the configuration of the battery to be manufactured.

The separator separates the positive electrode and the negative electrode, and enables the lithium ions to pass while preventing short-circuit of the current caused by the contact of the electrodes. For example, porous film made of synthetic resin such as polytetrafluoroethylene, polypropylene, polyethylene, or the like, or a porous film made of ceramics can be used as the separator.

The electrolysis solution that can be used for the lithium ion secondary battery can be used as the electrolysis solution. The electrolysis solution includes the solvent, and the electrolyte dissolved in the solvent.

For example, a cyclic ester, a chain ester, and an ether can be used as the solvent. As for a cyclic ester, for instance, ethylene carbonate, propylene carbonate, butylene carbonate, γ-butyrolactone, viniylene carbonate, 2-methyl-γ-butyrolactone, acetyl-γ-butyrolactone, γ-valerolactone, and the like can be used. As for a chain ester, for instance, dimethyl carbonate, diethyl carbonate, dibutyl carbonate, dipropyl carbonate, ethyl methyl carbonate, alkyl propionate, dialkyl malonate, alkyl acetate, and the like can be used. As for an ether, for instance, tetrahydrofuran, 2-methyl tetrahydrofuran, 1,4-dioxane, 1,2-dimethoxyethane, 1,2-diethoxyethane, 1,2-dibutoxyethane, and the like can be used.

For example, lithium salt such as $LiClO_4$, $LiAsF_6$, $LiPF_6$, $LiBF_4$, $LiCF_3SO_3$, $LiN(CF_3SO_2)_2$, and the like can be used as the electrolyte to be dissolved in the electrolysis solution.

For example, a solution in which lithium salt such as $LiClO_4$, $LiPF_6$, $LiBF_4$, $LiCF_3SO_3$, or the like is dissolved in the solvent such as ethylene carbonate, dimethyl carbonate, propylene carbonate, dimethyl carbonate, and the like at a concentration of approximately 0.5 mol/l to 1.7 mol/l can be used as the electrolysis solution.

The lithium ion secondary battery can be mounted on a vehicle. Because the lithium ion secondary battery has excellent cyclability, high performance vehicle can be obtained by mounting the lithium ion secondary battery on the vehicle. The vehicle merely needs to be a vehicle that uses the electric energy generated by the battery to all or a part of the power source. As the vehicle, for example, an electric automobile, hybrid automobile, plug-in hybrid automobile, hybrid rail vehicle, forklift, electric wheelchair, electric power-assisted bicycle, and electric two-wheel vehicle are given.

Some of the embodiment modes of the lithium ion secondary battery electrode, the manufacturing process for the same and the lithium ion secondary battery using such electrode according to the present invention have been explained. However, the present invention is not one which is limited to aforementioned embodiment modes described above. It is possible to execute the present invention in various modes, to which changes or modifications that one of ordinary skill in the art can carry out are made, within a range not departing from the gist.

EXAMPLES

Hereinafter, the present invention will be further explained in detail using examples.

Example No. 1

Making of Evaluation Electrode

SiO produced by Sigma-Aldrich Co. LLC was prepared as the active material. The alkoxy group containing silane modified polyamideimide resin which was produced by ARAKAWA CHEMICAL INDUSTRIES, LTD.; whose product name was COMPOCERAN; whose product number was H901-2; whose solvent composition was NMP/xylene (or Xyl); which had cured residuals in an amount of 30%; which exhibited a viscosity of 8,000 mPa·s; and which had silica in an amount of 2% by weight in the cured residuals (note herein that the "cured residuals" means solid contents after removing the volatile components by curing the resinous components) was prepared as the binder resin. The aggregated artificial graphite "MAG (Massive Artificial Graphite)" produced by Hitachi Chemical Co., Ltd. was prepared as a buffer. The KB (Ketjen black) produced by Ketjen Black International Co., was prepared as the conductive additive. The product name "BYK-355" produced by BYK Japan KK; which had cured residuals in an amount of 52%; (note herein that the "cured residuals" means solid contents after removing the volatile components by curing the resinous components) was prepared as the acrylic type copolymer.

The active material, the buffer, the conductive additive, and the binder resin were mixed in the proportion of active material:buffer:conductive additive:binder resin=48:34.4:2.6:15 (% by mass). An appropriate amount of NMP was added as solvent to the mixture and adjusted, and thereafter, the acrylic type copolymer was added to obtain the slurry. The added amount of acrylic type copolymer in this case is 1% by mass assuming the entire slurry is 100% by mass.

After adjusting the slurry, the slurry was placed on an electrolytic copper foil with 20-μm thickness, and the slurry was applied to a film form on the electrolytic copper foil using the doctor blade. The obtained sheet was dried for 20 minutes at 80° C. to volatilize and remove the NMP, and thereafter, the current collector and the applied material on the current collector were joined together firmly by adhesion by means of a roll press machine. The joined material was heated with a vacuum dryer for two hours at 200° C. and cut into a predetermined shape (rectangle of 26 mm×31 mm) to obtain an electrode having a thickness of about 35 μm. This electrode was labeled as the electrode of Example No. 1.

In the electrode of Example No. 1, the thickness of the coated layer is estimated to be about 200 nm from the compounding amount of acrylic type copolymer.

<Making of Laminate Type Lithium Ion Secondary Battery>

The electrode of Example No. 1 was used as the negative electrode. The following electrode was made as the positive electrode. Aluminum foil with 20 μm in thickness was used as the current collector, $LiNi_{1/3}Co_{1/3}Mn_{1/3}O_2$ was used for the positive electrode active material, acetylene black was used as the conductive additive, and the polyvinylidene fluoride (PVDF) was used as the binder resin. The active material, the conductive additive, and the binder resin were mixed in the proportion of $LiNi_{1/3}Co_{1/3}Mn_{1/3}O_2$:acetylene black:polyvinylidene fluoride (PVDF)=88:6:6 (% by mass). An appropriate amount of NMP was added as solvent to the mixture and adjusted to obtain the slurry. The slurry was placed on the aluminum foil having a thickness of 20 μm, and the slurry was applied to a film form on the aluminum foil using the doctor blade. The obtained sheet was dried for 30 minutes at 80° C. to volatilize and remove the NMP, and thereafter, the current collector and the applied material on the current collector were pressed with the roll press machine so that the thickness of the applied material becomes 50 μm, that is, the total thickness of the electrode becomes 70 μm. This was punched out to a predetermined shape similar to the negative electrode, and the obtained article was heated in vacuum for six hours at 120° C. to obtain the positive electrode. The capacity of the positive electrode was 3.0 mAh/cm², and the electrode density was 2.3 g/cm². The solution in which one mol of $LiPF_6$ is dissolved in the solvent in which ethylene carbonate (EC) and diethyl carbonate (DEC) are mixed at EC:DEC=3:7 (volume ratio) was used as the electrolysis solution.

The laminate type battery was made using the positive electrode and the negative electrode described above. Specifically, a rectangular sheet (27×32 mm, thickness of 25 μm)

made of polypropylene resin was inserted as a separator between the positive electrode and the negative electrode to obtain the electrode assembly. The electrode assembly was covered with a pair of laminate films and the three sides were sealed, and thereafter, the electrolysis solution described above was injected into the bag-shaped laminate film. Subsequently, the remaining one side was sealed so that the four sides are air-tightly sealed, whereby the laminate type battery in which the electrode assembly and the electrolysis solution are sealed is obtained. The positive electrode and the negative electrode include a tab electrically connectable with the outside, a part of the tab extending to the outer side of the laminate type battery. The laminate type lithium ion secondary battery using the electrode of Example No. 1 was obtained through the above steps. This was labeled as the lithium ion secondary battery of Example No. 1.

Example No. 2

At first, the half-cell was assembled using the negative electrode of Example No. 1 and the metal lithium foil and the negative electrode of Example No. 1 inserted with Li was prepared by acting the half-cell at temperature of 25° C., rate of ⅟₁₀₀ C, and cut-off of 0 CV to 0.01V. The lithium ion secondary battery of Example No. 2 was made in combination with the negative electrode of Example No. 1 inserted with Li and the positive electrode similar to the positive electrode of Example No. 1 other than using the vanadium oxide ($V_2O_5$) as the positive electrode active material.

Comparative Example No. 1

The electrode of Comparative Example No. 1 was made similarly to the electrode of Example No. 1 other than that the acrylic type copolymer was not added to the slurry, and the laminate type lithium ion secondary battery using the electrode of Comparative Example No. 1 was made similarly to the lithium ion secondary battery of Example No. 1. This was labeled as the lithium ion secondary battery of Comparative Example No. 1.

<Confirmation of Coated Layer Formed on Electrode>

The surface of each electrode of Example No. 1 and Comparative Example No. 1 was analyzed with Auger Electron Spectrometry (AES). The measuring place is a range of 25 μmm×30 μm angle, and the measuring condition is acceleration voltage 10 kV and specimen current 10 nA. The measurement was conducted with an energy step of 1 eV, a signal accumulating time per one step of 20 milliseconds, and a scanning number of times of seven times for a range of kinetic energy of 0 eV to 700 eV. The entire surface of the electrode is assumed to be represented with the measurement of the range of 25 μmm×30 μm angle.

TABLE 1

|  | Si | C | N | O |
|---|---|---|---|---|
| Example No. 1 | — | 91.9 | 4.1 | 4 |
| Comparative Example No. 1 | 11.5 | 70 | 5.5 | 13 |

Figure 2:
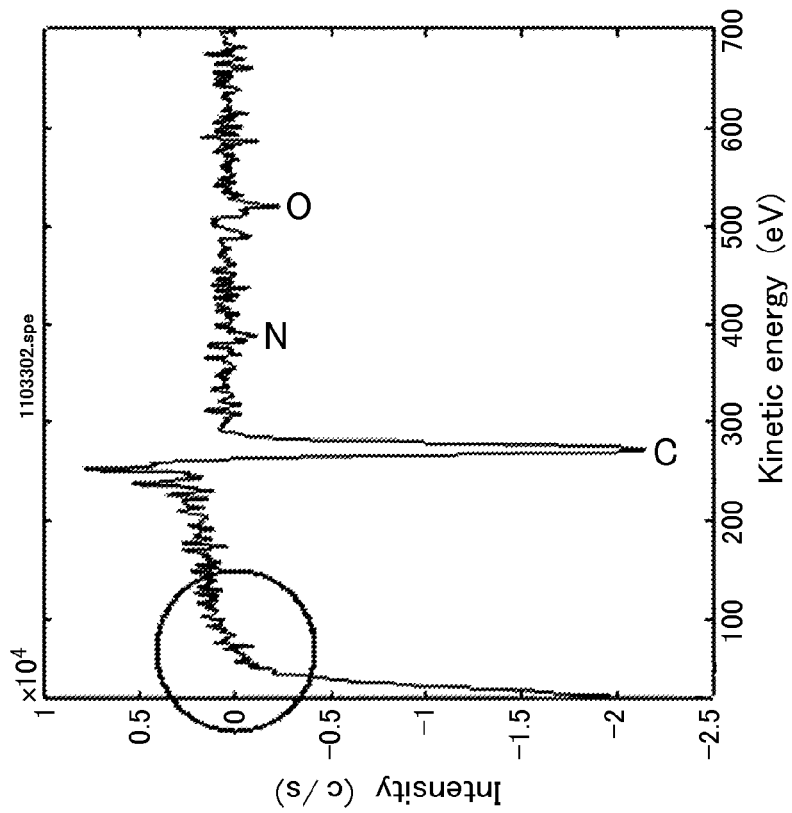
FIG. 2 is a graph comparing Auger Electron Spectroscopy (AES) analysis results of the electrode of Example No. 1 and Comparative Example No. 1.
Figure 2:
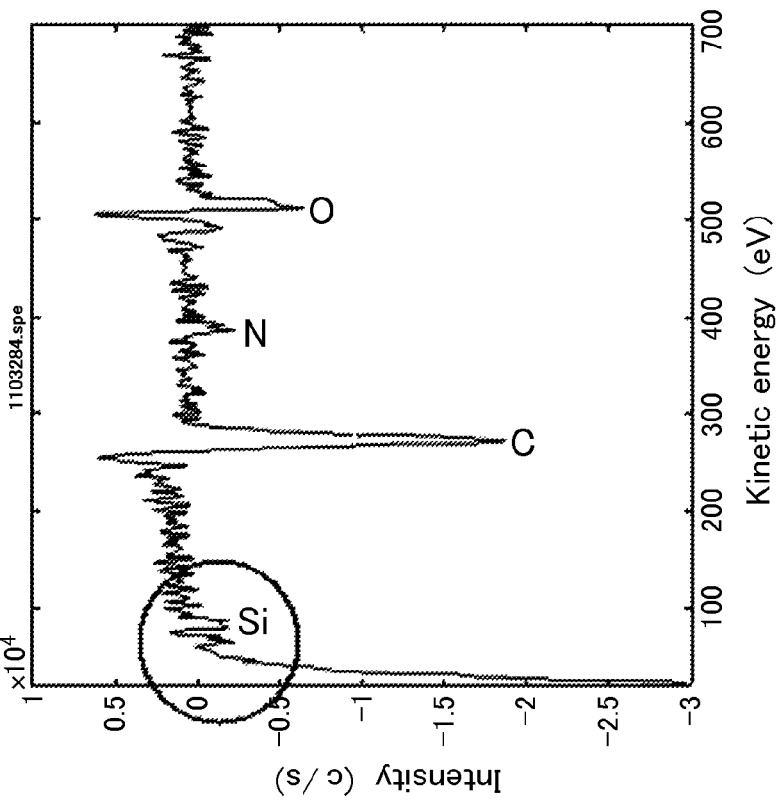

According to FIG. 2 and Table 1, the peak of Si originating from the active material SiO, which was observed at the electrode surface in the electrode of Comparative Example No. 1, was not observed at the electrode surface in the electrode of Example No. 1. The peak of Si was observed as a result of analyzing the surface of the electrode of Example No. 1 with the energy dispersive spectroscopy (EDS) that obtains the information of not only the outermost surface but also the inside of the electrode. Thus, it is assumed that the active material at the electrode surface is covered by the coated layer in the electrode of Example No. 1.

<Battery Evaluation>
(Charging/Discharging Test)

The charging/discharging test of the lithium ion secondary battery of Example No. 1 and the lithium ion secondary battery of Comparative Example No. 1 was conducted. In the charging/discharging test, the load test (6 cycles) and the cycle test (100 cycles) were combined.

The load test was conducted two times that are six cycles from the first cycle and another six cycles from the 107th cycle. In the load test, the charging was performed with charging rate of 0.2 C and CCCV charging (constant current constant voltage charging) of a voltage of 4.2V, and the discharging was performed with CC discharging (constant current discharging) in which the charging rate is 0.2 C, 1 C, 2 C, 3 C, 4 C, and 5 C in order from the first cycle at a voltage of 2.5V. In this case, the current that discharges the electric capacity in one hour is expressed as 1 C, and the current that discharges the electric capacity in five hours is expressed as 0.2 C. Therefore, the current value of 1 C is five times the current value of 0.2 C.

The cycle test was performed from the 7th cycle up to 106th cycle after the first load test, and then performed up to 200th cycle continuously after performing the second load test. The charging was performed with CCCV charging of charging rate 1 C at a voltage 4.2V and the discharging was performed with CC discharging of discharging rate 1 C at a voltage 2.5V.

Each discharging capacity maintenance rate was calculated with the discharging capacity of charging/discharging performed at the discharging rate of 1 C of the 7th cycle as the basis. The cycle test was performed at 45° C. as the acceleration test. The discharging capacity maintenance rate (%) was obtained with the following equation.

Discharging capacity maintenance rate (%)=(discharging capacity of each cycle/discharging capacity of 7th cycle performed at discharging rate 1 C)×100

Figure 3:
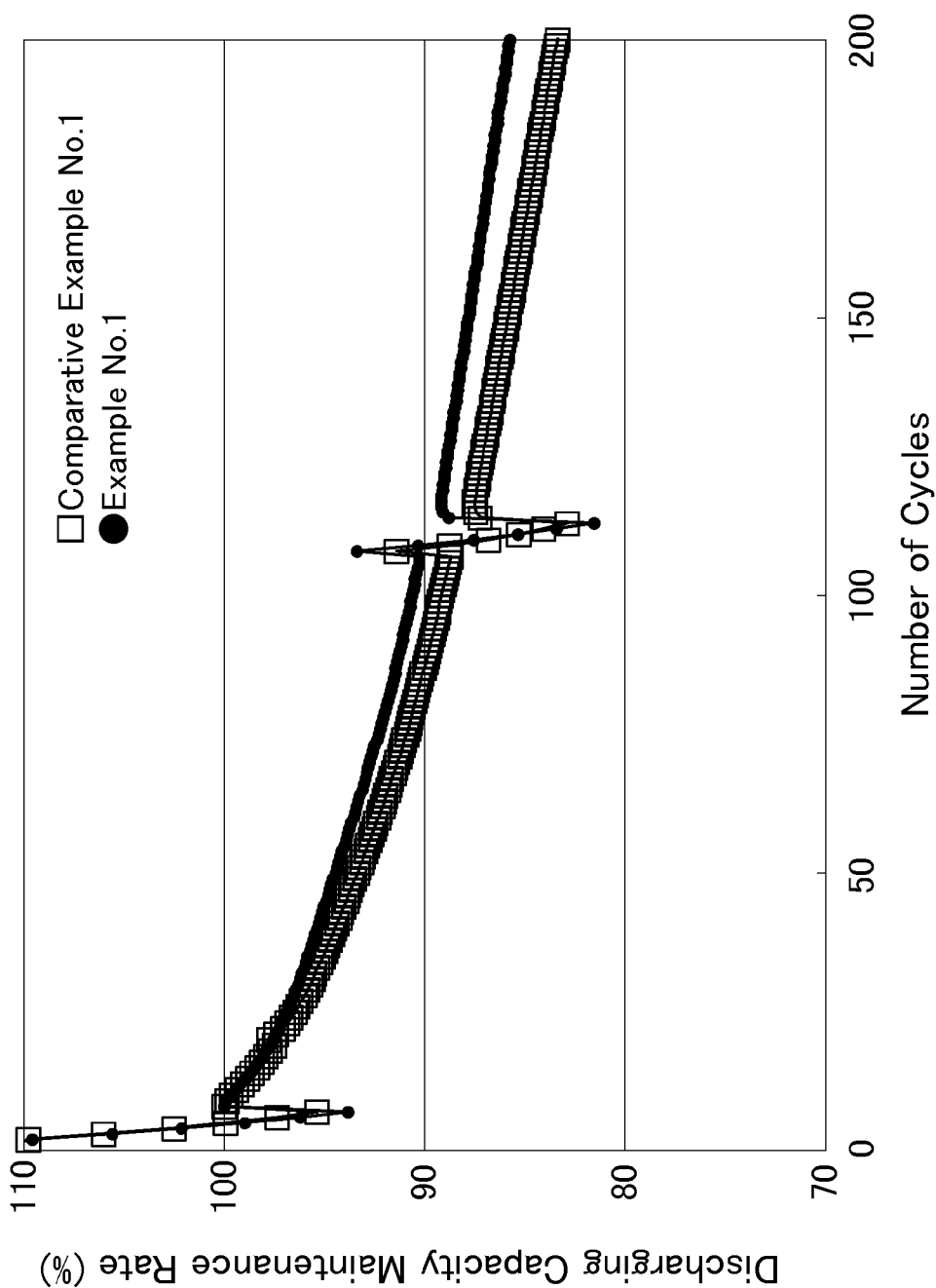
FIG. 3 is a graph that shows the number of cycles and a discharging capacity maintenance rate for a lithium ion secondary battery of Example No. 1 and that of Comparative Example No. 1.

FIG. 3 is a graph showing a relationship of the number of cycles and a discharging capacity maintenance rate (%) for lithium ion secondary batteries of Example No. 1 and Comparative Example No. 1. As apparent from FIG. 3, the lowering rate of the discharging capacity in each cycle was small in the lithium ion secondary battery of Example No. 1 as compared to the lithium ion secondary battery of Comparative Example No. 1. Furthermore, the discharging capacity maintenance rate after 200 cycles was about 83% in the lithium ion secondary battery of Comparative Example No. 1, whereas the discharging capacity maintenance rate after 200 cycles was maintained about 86% in the lithium ion secondary battery of Example No. 1.

That is, according to the results of the cycle test, the lithium ion secondary battery of Example No. 1 was found to excel in cyclability as compared to the lithium ion secondary battery of Comparative Example No. 1. This may be because the decomposition of the electrolysis solution is suppressed for a long period of time by the coated layer.

Furthermore, the lithium ion secondary battery of Example No. 1 was found to have high discharging capacity maintenance rate as compared to the lithium ion secondary battery of Comparative Example No. 1 up to the discharging rate 2 C according to the results of the second load test. Therefore, it was found that the effect of suppressing the decomposition of the electrolysis solution is exhibited and the discharging capacity maintenance rate of the battery is enhanced by the coated layer even at the time of rapid charging/discharging of the discharging rate 2 C.

A case in which the coated layer is formed on the negative electrode has been described in the example, but similar effects can be obtained even if the coated layer is formed on the positive electrode. The second example is also assumed to have effects similar to Example No. 1.

The invention claimed is:

1. A lithium ion secondary battery electrode comprising:
   a current collector;
   an active material layer containing an active material and a binder formed on a surface of the current collector; and
   a coated layer formed on a surface of at least a part of the active material layer, wherein
   the coated layer consists of a cured acrylic copolymer, the cured acrylic copolymer comprising an acrylic main chain and a side chain having polyester graft-polymerized to said acrylic main chain or polyether graft-polymerized to said acrylic main chain, and
   the coated layer is chemically bonded with the binder,
   wherein the active material layer and the coated layer are formed from a slurry comprising at least the active material, a binder resin which becomes the binder upon curing, and an acrylic copolymer which becomes the cured acrylic copolymer upon curing, and a content of the acrylic copolymer in the slurry is 0.1 to 2% by mass assuming the entire slurry is 100% by mass.

2. The lithium ion secondary battery electrode as set forth in claim 1, wherein the coated layer is formed on the surface of the active material layer by thermally decomposing at least a part of the polyester or the polyether to be chemically bonded with the binder.

3. The lithium ion secondary battery electrode as set forth in claim 1, wherein the binder is alkoxy group containing silane modified polyamideimide resin.

4. A lithium ion secondary battery, comprising: a positive electrode, a negative electrode and a separator, wherein at least one of the positive electrode and the negative electrode is the lithium ion secondary battery electrode as set forth in claim 1.

5. The lithium ion secondary battery as set forth in claim 4, wherein the positive electrode includes a positive electrode active material that does not contain Li.

6. The lithium ion secondary battery as set forth in claim 5, wherein the positive electrode active material includes at least one selected from the group consisting of elemental sulfur, sulfur-carbon composite, manganese dioxide, and vanadium oxide.

7. The lithium ion secondary battery as set forth in claim 4, wherein the lithium ion secondary battery includes an electrolysis solution comprising an electrolyte dissolved in a solvent.

8. A manufacturing process for a lithium ion secondary battery electrode comprising:
   a slurry making step of mixing an active material, a binder resin, and an acrylic copolymer to make slurry;
   a slurry applying step of applying the slurry on a surface of a current collector; and
   a heat treatment step of heating the slurry applied onto the surface of the current collector to cure the binder resin and the acrylic copolymer and to chemically bond the acrylic copolymer and the binder resin, wherein
   the acrylic copolymer includes an acrylic main chain and a side chain having polyester graft-polymerized to said acrylic main chain or polyether graft-polymerized to the acrylic main chain, and
   in the slurry making step, the acrylic copolymer and the binder resin are incompatible with each other.

* * * * *